United States Patent [19]
Ohshima et al.

[11] Patent Number: 5,161,079
[45] Date of Patent: Nov. 3, 1992

[54] TAPE CASSETTE WITH SLIDABLE SHUTTER

[75] Inventors: Mineo Ohshima, Yawata; Akinobu Fujikawa, Hirakata, both of Japan

[73] Assignee: Matsushita Electric Industrial Co., Ltd., Osaka, Japan

[21] Appl. No.: 640,734

[22] Filed: Jan. 16, 1991

[30] Foreign Application Priority Data

Jan. 19, 1990 [JP] Japan ................................ 2-11289
Feb. 22, 1990 [JP] Japan ................................ 2-41789
Feb. 28, 1990 [JP] Japan ................................ 2-47598

[51] Int. Cl.$^5$ .............................................. G11B 23/08
[52] U.S. Cl. ................................................ 360/132
[58] Field of Search .......................... 360/132, 133

[56] References Cited

U.S. PATENT DOCUMENTS

| | | | |
|---|---|---|---|
| 3,706,976 | 12/1972 | Tagawa et al. | 360/132 |
| 4,497,008 | 1/1985 | Schoermakers | 360/132 |
| 4,618,903 | 10/1986 | Oishi et al. | 360/132 |

FOREIGN PATENT DOCUMENTS

| | | | |
|---|---|---|---|
| 0139184 | 8/1984 | Japan | 360/132 |
| 0171090 | 9/1984 | Japan | 360/132 |
| 0001686 | 1/1985 | Japan | 360/132 |
| 1052249 | 12/1966 | United Kingdom . | |

Primary Examiner—David J. Severin
Attorney, Agent, or Firm—Wenderoth, Lind & Ponack

[57] ABSTRACT

A tape cassette is provided which is suitable for digital recording and playback which require high reliability, is interchangeable in terms of dimensions and shape with conventional compact cassettes, and is provided with a shutter member which selectively opens and closes insertion windows for the magnetic head and pinch rollers and is normally urged in the closing direction, to thereby prevent dust, etc. from entering. Moreover, since the shutter member is arranged to slide in the longitudinal direction, there is no increase in the volume of the tape cassette, even during opening or closing of the shutter member.

8 Claims, 9 Drawing Sheets

TAPE CASSETTE WITH SLIDABLE SHUTTER

BACKGROUND OF THE INVENTION

The present invention generally relates to a magnetic tape and more particularly, to a tape cassette for storing therein a magnetic tape capable of recording and reproducing audio and/or video information such as music, video images, etc.

Conventionally, as a tape cassette, there has been proposed a compact cassette, for example, as shown in FIG. 5, which is so arranged that a magnetic tape accommodated therein is exposed from a cassette shell housing 38, or cassette shells (referred to as a cassette shell housing hereinafter) through a magnetic head insertion window 34 and pinch roller insertion windows 35 formed at one side of the cassette shell housing 38 for inserting the magnetic heads and pinch rollers thereinto as disclosed, for example, in British Patent Publication No. 1,052,249 (the compact tape cassette in FIG. 5 will be described in more detail later).

Meanwhile, another conventional compact cassette 41 as shown in FIG. 16 includes a shield board 47 provided in front of magnetic heads 21 inserted in the insertion windows of the cassette shell housing 48. This shield board 47 protects the magnetic heads against electromagnetic waves emitted from mechanisms and external units.

Similarly, there is also available a tape cassette having a shutter member which shuts off the magnetic head insertion windows and pinch roller insertion window, etc. when the tape cassette is in a non-use state. These are called, for example, video tape cassettes or digital audio tape cassettes (referred as "DAT" hereinafter), each of which tape cassettes is arranged to pull out the magnetic tape when mounted on a magnetic tape recording/reproducing apparatus through rotation of the shutter member which closes such windows.

In the conventional compact cassette as referred to above, however, since the magnetic tape is exposed by the insertion windows for inserting the magnetic heads in the cassette shell housing and the insertion window for inserting the pinch-roller in the cassette shell housing, etc., dust entering through such insertion windows tends to adhere to the recording and reproducing surface of the magnetic tape. Also, an operator's hand may unintentionally or accidentally touch the recording and reproducing surface, thereby damaging it.

Meanwhile, in the video tape cassettes and DAT cassettes or the like as referred to above, it is not possible for dust or the like to enter inside, since the magnetic tape is protected by the shutter member when it is closed. But in the case where the tape cassette is to be mounted on a magnetic recording/reproducing apparatus for recording and reproducing, it is necessary to open the shutter member so as to pull out the magnetic tape, such that dust or the like may adhere to the recording and reproducing surface of the magnetic tape which is then exposed.

Moreover, during the process for rotating the shutter member and when the shutter member is in an open position, the tape cassette undesirably occupies a larger volume, thus presenting a problem which hinders reduction in size of related appliances.

Another disadvantage is that in the shielding structure of the above conventional compact cassette, there is provided no means for shielding against the electromagnetic waves from the upper, lower, left, and right sides of the magnetic heads. In order to reduce the influence of the electromagnetic waves from the mechanisms as such as possible, another means to prevent electromagnetic waves inside the mechanism must be introduced.

SUMMARY OF THE INVENTION

Accordingly, an essential object of the present invention is to provide an improved tape cassette which is interchangeable with conventional tape cassettes in terms of dimensions and configuration, and is suitable for digital recording/reproducing for which it is necessary to reliably prevent the entry of dust or the like, to thereby contribute to reduction in size of related appliances.

Another object of the present invention is to provide a tape cassette of the above described type which has electro-magnetic shielding effects so as to protect magnetic heads against electro-magnetic waves directed from internal mechanisms and external appliances, etc.

In accomplishing these and other objects, according to one aspect of the present invention, there is provided a tape cassette which includes a cassette shell housing having a tape storing portion for storing a magnetic tape therein, a pair of reel insertion holes for receiving reel spindles for winding the magnetic tape, and a window portion having almost the same thickness as the tape storing portion and being formed with insertion windows for receiving magnetic heads and a pinch roller, and a shutter member with a U-shaped cross section for selectively opening and closing the insertion windows through sliding movement. The shutter member is guided along a guide groove formed in the cassette shell housing and is normally urged in a closing direction. A coupling portion is disposed adjacent to one side face of the shutter member and is provided at a front side of the cassette shell housing. The center position at one edge of the coupling portion in the tape travelling direction is set to be 34 mm or more from an intermediate center position between the pair of reel insertion holes in the tape travelling direction.

According to a second aspect of the present invention, there is also provided a tape cassette which includes a cassette shell housing which stores a recording medium in the form of a tape and is formed with a plurality of insertion windows in its front face and reel insertion holes in only one of its side faces, and a shutter member with a U-shaped cross section for selectively opening and closing the insertion windows through sliding movement.

The shutter member has a pinch roller insertion opening at a position corresponding to the insertion window for the pinch roller, and a rearwardly extending recess provided adjacent to the pinch roller insertion opening for the pinch roller in one of the upper and lower faces of the shutter member which covers the reel insertion holes, at an open position of the shutter member.

In a third aspect of the present invention, the tape cassette includes a cassette shell housing which stores a recording medium in the form of a tape, and is formed with a plurality of insertion windows in its front face, a shield board accommodated inside one of the insertion windows for inserting magnetic heads of the cassette shell housing, and a shutter member having a U-shaped cross section and made of a shielding material for selectively opening and closing the insertion windows through sliding movement.

The length of the two faces of the shutter member, which extend in a direction for inserting the magnetic heads (i.e. the front-to-rear direction), is set to be longer than a length from a front face of the shutter member to the shield board provided inside of the magnetic head insertion window.

According to the arrangements of the present invention as described above, in the tape cassette of the first aspect, the tape storing portion has the same thickness as the window portion, and the insertion windows provided on the window portion are arranged to be selectively opened and closed by the slidably movable shutter member. The coupling portion provided adjacent to this shutter member is positioned 34 mm or more away from the center between the pair of reel spindle insertion holes. When this tape cassette is loaded on a magnetic recording/reproducing apparatus, a shutter member opening/closing means provided on the side of the apparatus is coupled to the coupling portion, and slides and opens the shutter member in the tape travelling direction (i.e. in the side-to-side or longitudinal direction).

In the second aspect of the present invention, the tape cassette has the shutter member which selectively opens and closes the insertion windows through sliding movement. Since the shutter member has the recess for the pinch roller on the bottom thereof, and no recess for the pinch roller on its top side in the open position of the shutter member, the shutter member prevents dust from entering from above, and provides the inserted pinch roller with sufficient tape driving force.

In the tape cassette according to the third aspect of the present invention, the front, upper, lower, left and right sides of the magnetic heads inserted in the insertion windows are covered with a shield material.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
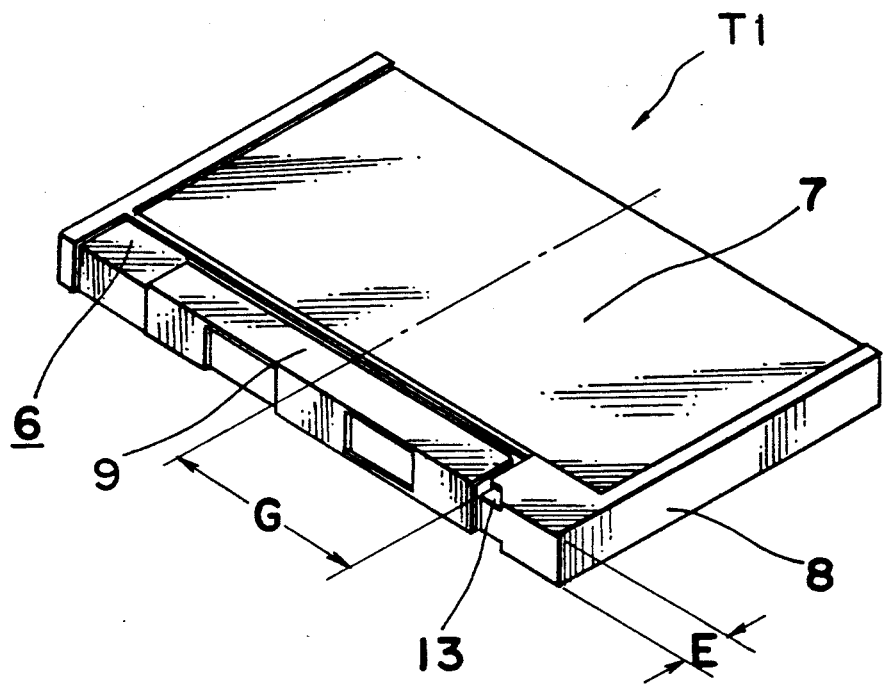
FIG. 1 is a perspective view of a tape cassette according to one preferred embodiment of the present invention as observed from above.
Figure 2:
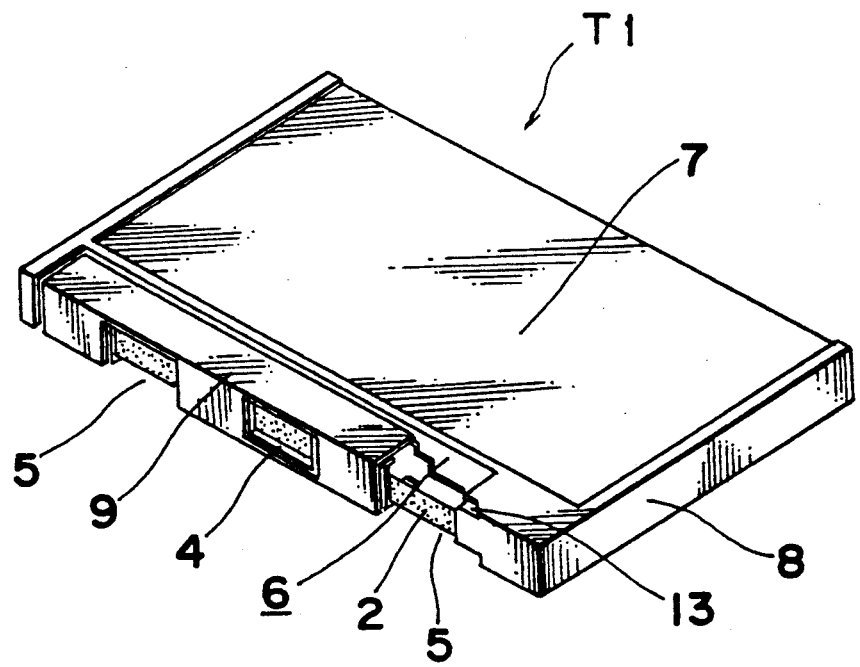
FIG. 2 is a perspective view similar to FIG. 1, with a shutter member thereof in an open position.

Before the description of the present invention proceeds, it is to be noted that like parts are designated by like reference numerals throughout the accompanying drawings.

Referring now to the drawings, tape cassettes according to the present invention will be described hereinafter.

In the first place, the general construction of the conventional compact cassette commercially available at present, and also referred to earlier will be explained with reference to FIG. 5 before describing the tape cassettes of the present invention.

Figure 5:
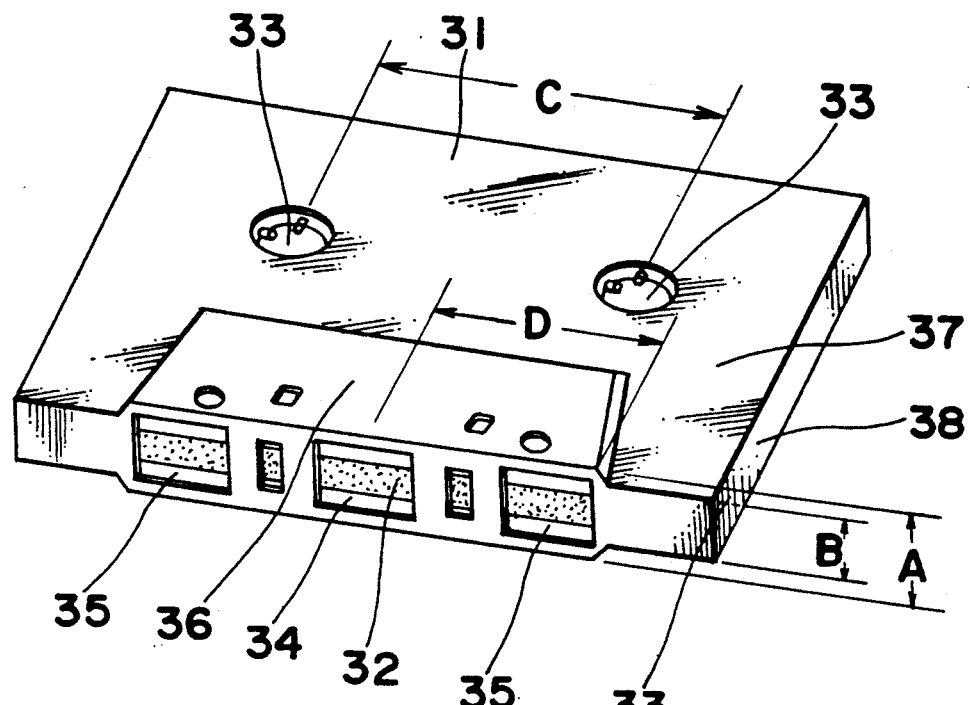
FIG. 5 is a view similar to FIG. 1, but which shows a conventional compact cassette.

In FIG. 5, the known compact tape cassette 31 includes the cassette shell housing 38 having a tape storing portion 37 for storing a magnetic tape 32, a pair of reel insertion holes 33 for receiving reel spindles to wind the magnetic tape 32, and a window portion 36 having a magnetic head insertion window 34 and pinch roller insertion windows 35, with a thickness A of the window portion 36 being set to be larger than a thickness B of the tape storing portion 37.

According to the standards for compact cassettes, a distance C between the pair of reel insertion holes 33 is set to be 42.5 mm and a distance D at the window portion 36, from a center or an intermediate point between the reel insertion holes 33 to one edge of the window portion 36 is 34 mm.

Referring particularly to FIGS. 1 to 4, there is shown a tape cassette T1 according to one preferred embodiment of the present invention, which generally includes a cassette shell housing 8 having a tape storing portion 7 for storing a magnetic tape 2 therein, a pair of reel insertion holes 3 for receiving reel spindles (not shown) for winding the magnetic tape 2, and a window portion 6 having almost the same thickness as the tape storing portion 7 and formed with an insertion window 4 for receiving a magnetic head and insertion windows 5 for receiving pinch rollers, and a shutter member 9 with a U-shaped cross section for selectively opening and closing the insertion windows 4 and 5 through sliding movement. Guides 10 are provided on the shutter member 9 and are slidably guided along guide grooves 11 formed in the cassette shell housing 8 in a longitudinal direction. The shutter member 9 is normally urged in a closing direction by an urging means 12. A coupling portion 13 is disposed adjacent to one side face of the shutter member 9 and is provided at a front side of the cassette shell housing 8, with a distance G along the longitudinal direction between one edge of the coupling portion 13 being set to be 34 mm or more from a longitudinally center position between the pair of reel insertion holes 3.

Here, the thickness E of the cassette shell housing 8 having the tape storing portion 7 and the window portion 6 is set to be equal to the thickness B of the tape storing portion 37 of the conventional compact cassette 31, referred to earlier with reference to FIG. 5.

The distance F between the pair of reel insertion holes 3 is set to be the same as the distance C between the pair of reel insertion holes 33 of the conventional cassette 31 of FIG. 5. The distance G along the longitudinal direction from the longitudinally center position between the reel insertion holes 3 to the position at one edge of the coupling portion 13 is set to be 34 mm, which is the same as the distance D in the known compact cassette 31 in FIG. 5.

Figure 6:
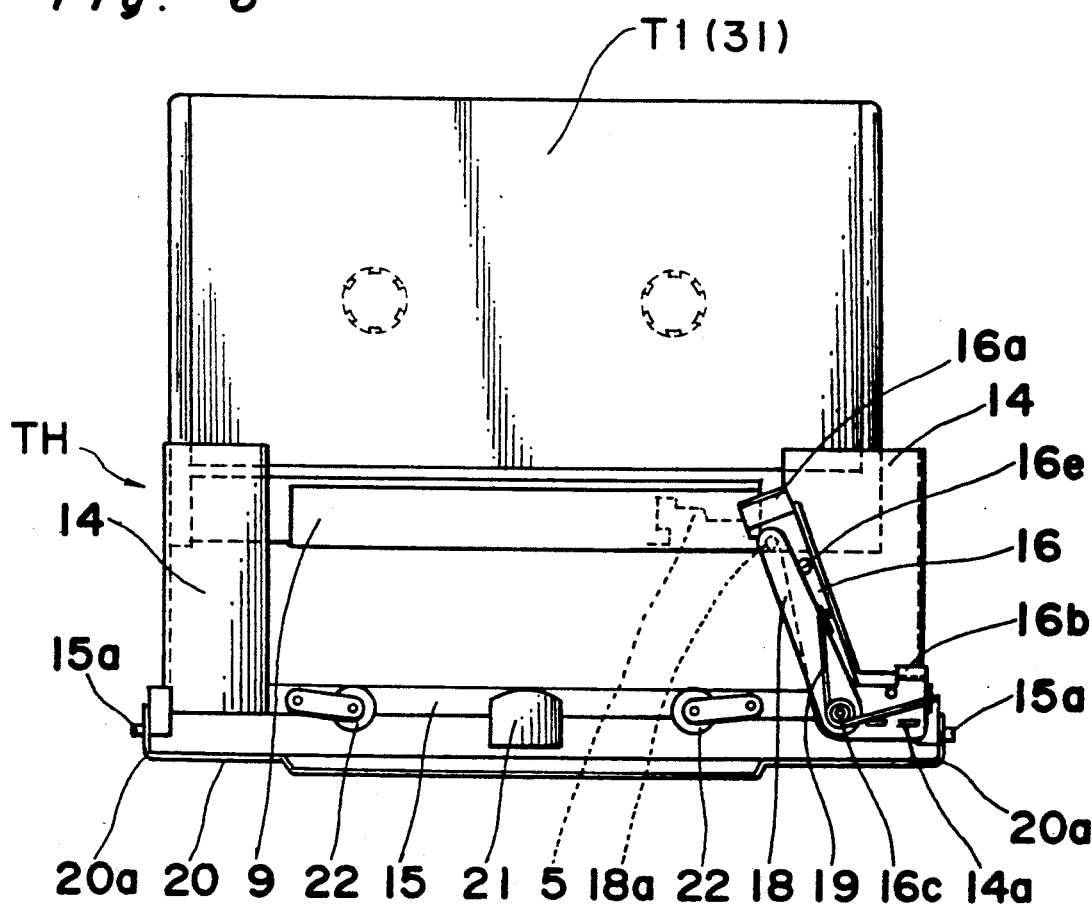
FIG. 6 is a top plan view showing the tape cassette according to the one preferred embodiment of the present invention which has begun to be loaded in a holder of a magnetic recording/reproducing apparatus.
Figure 7:
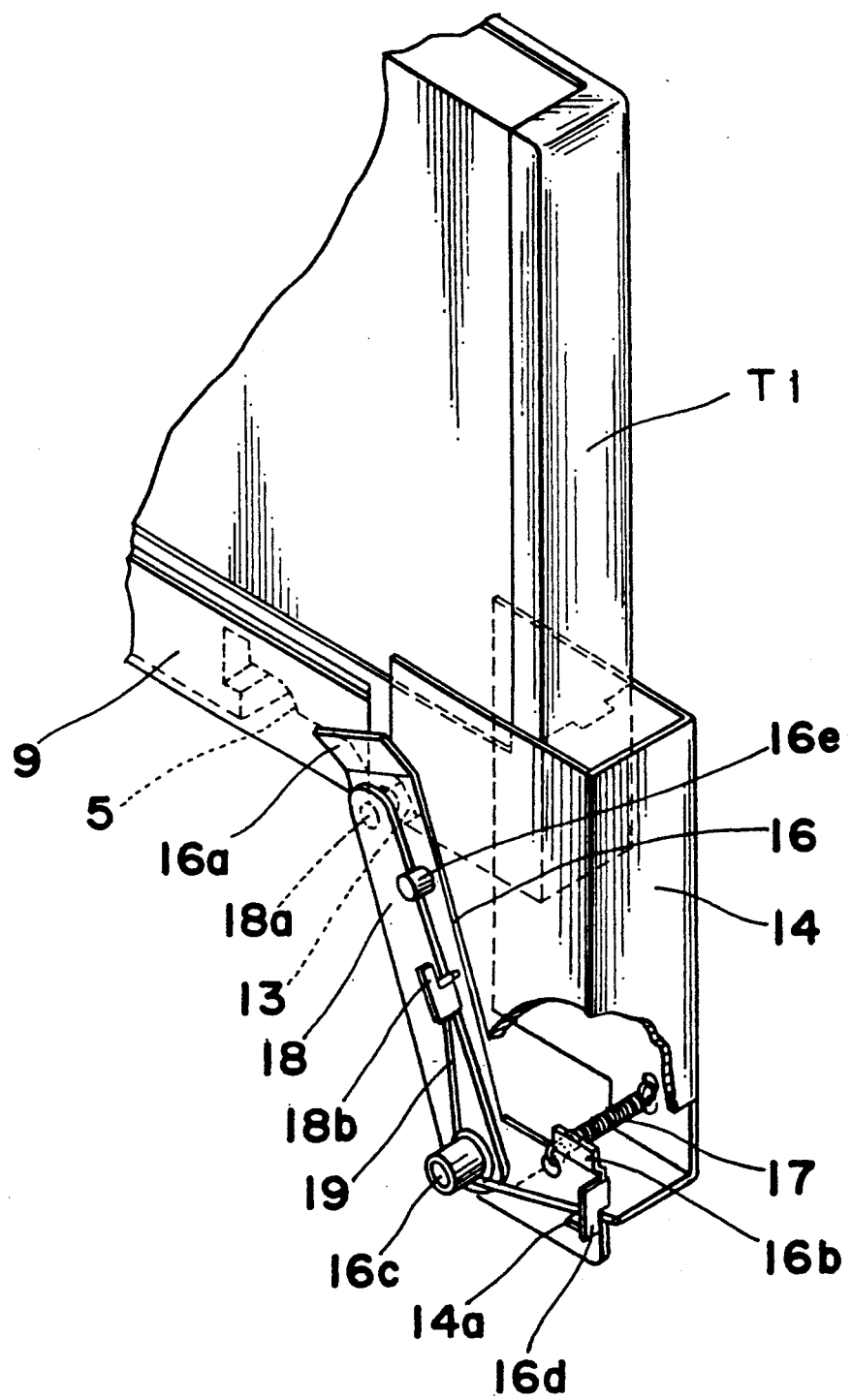
FIG. 7 is a fragmentary perspective view representing, on an enlarged scale, the holder and tape cassette shown in FIG. 6.

Referring also to FIGS. 6 and 7, there is shown a holder 14 mounted on a holder base 15 so as to construct a holder portion TH of a magnetic recording/reproducing apparatus, which may detachably hold either the conventional compact tape cassette 31 of FIG. 5 or the tape cassette T1 according to the present invention.

In the holder portion TH referred to above, a detecting lever 16 which detects the window portion 36 of the compact cassette 31 is pivotally provided for movement around the holder 14 through a fulcrum of a projection 14a which is on the bottom of the holder 14. The forward end 16a of the lever 16 is bent into an approximately V-shape, and is urged by an urging means 17 so as to be brought into general contact with the tape storing portion 37 or 7 of the known compact cassette 31 or the tape cassette T1. A stopper 16b of the lever 16 contacts holder 14 to keep the detecting lever 16 in position.

There is also pivotally provided in the holder portion TH, a turning lever 18 for rotation about a pivotal shaft 16c of the detecting lever 16. The lever 18 has a pin 18a on its distal end for opening the shutter member 9 in association with the inserting operation of the tape cassette T1.

Normally, the turning lever 18 is urged by an urging means 19 in the direction for ejecting the tape cassette T1. One end of the urging means 19 is engaged with a projection 16d of the detecting lever 16, while the other end is coupled with a projection 18b of the turning lever 18. The turning lever 18 is stopped at a specified position by a stopper 16e provided on the detecting lever 16.

Shafts 15a are provided on opposite ends of the holder base 15, so as to be rotatable through bearings 20a provided on both ends of a base plate 20. Magnetic heads 21 and pinch rollers 22 are movably provided on the holder base 15.

Functioning will be described hereinafter with respect to the case where the tape cassette according to the present invention is loaded in the holder portion having the construction as explained so far.

Figure 8:
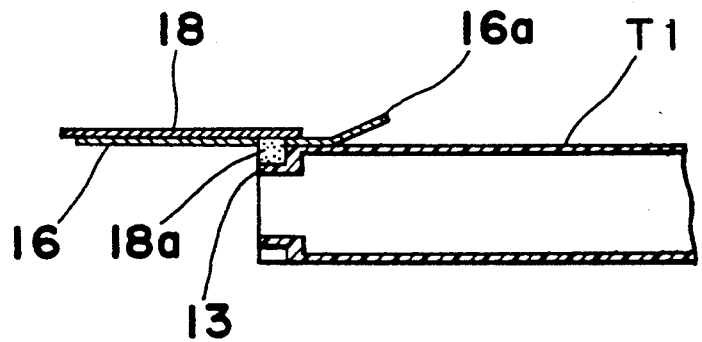
FIG. 8 is a fragmentary side sectional view for explaining an essential portion of FIG. 6.

Referring to FIGS. 6, 7 and 8, when first inserting the tape cassette T1, the pin 18a at the forward end of the turning lever 18 is guided to the coupling portion 13 which is close to the shutter member 9 of the tape cassette T1. By further inserting the tape cassette T1, the turning lever 18 is rotated, and is urged in the ejecting direction by the urging means 19. Accordingly, the pin 18a is guided by the shape of the insertion windows 5 for the pinch rollers on the tape cassette T1, and causes the shutter member 9 to slide in the opening direction.

Figure 9:
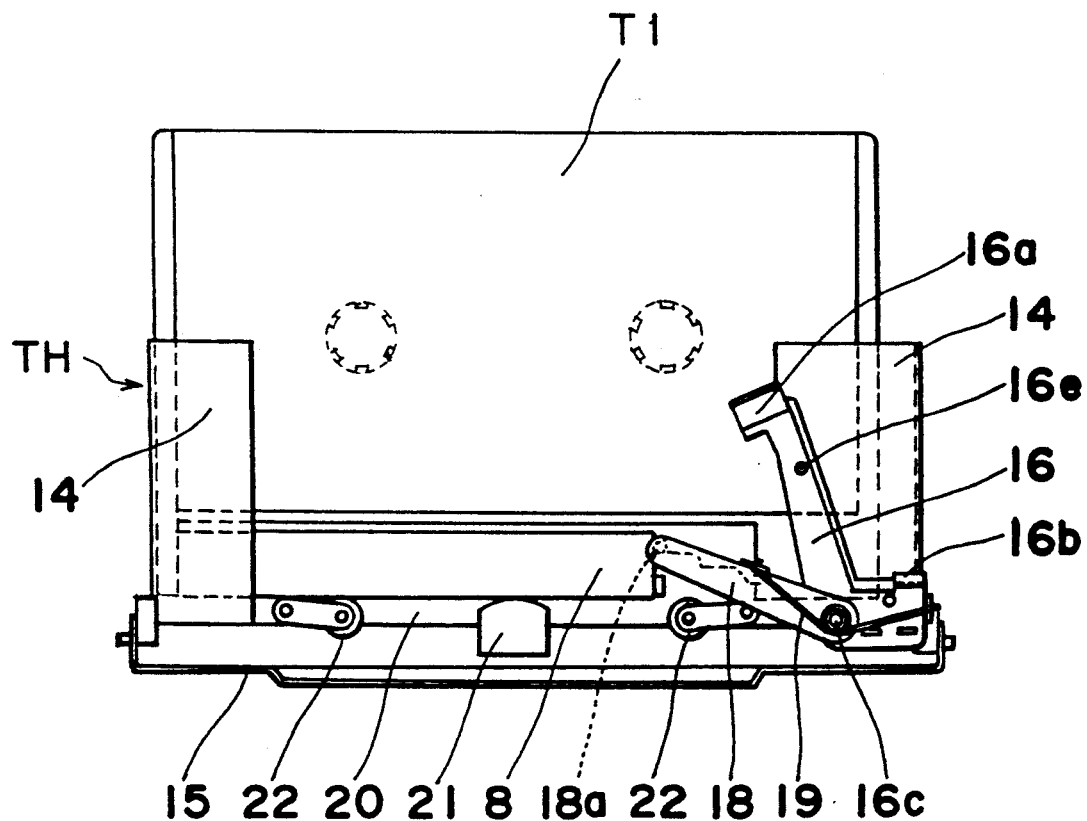
FIG. 9 is a view similar to FIG. 6, but which particularly shows a state of the tape cassette according to the one preferred embodiment of the present invention when it has been completely mounted in the holder of the magnetic recording/reproducing apparatus.

When the loading of the tape cassette T1 has been finished as shown in FIG. 9, the shutter member 9 is in the open position so that magnetic heads 21 and pinch rollers 22 can be inserted.

Figure 10:
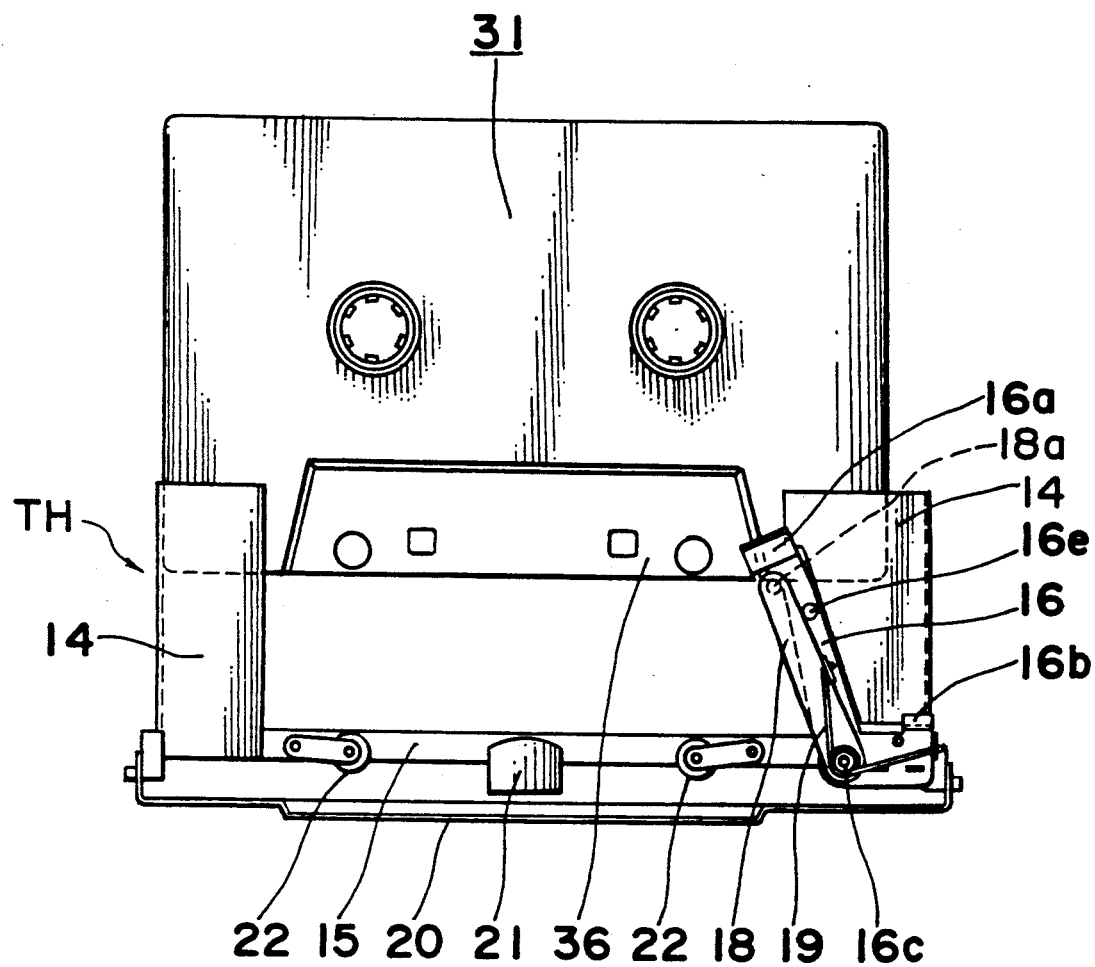
FIG. 10 is a top plan view showing the conventional compact tape cassette of FIG. 5 which has begun to be loaded in the holder of the magnetic recording/reproducing apparatus.
Figure 11:
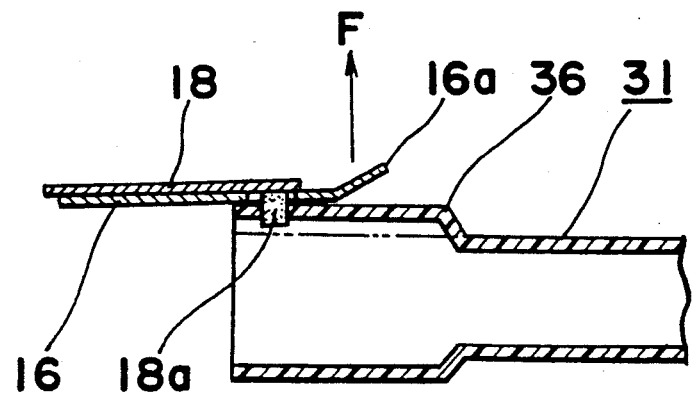
FIG. 11 is a fragmentary side sectional view for explaining an essential portion of FIG. 10.

FIG. 10 shows the state where the conventional compact cassette 31 is first being inserted in the holder portion TH for loading. Since the distance G along the longitudinal direction from the longitudinally center position between the reel insertion holes 3 to the position at one edge of the coupling portion 13 of the cassette shell housing 8 is set to be 34 mm or more, the pin 18a at the forward end of the turning lever 18 is located in the vicinity of (at the right side in this example) but without overlapping the window portion 36 of the compact cassette 31. Thus, as shown in FIG. 11, the forward end portion 16a of the detecting lever 16 which is near the turning lever 18 rides onto the window portion 36 of the compact cassette 31, and the detecting lever 16 turns in the direction of an arrow F, to thereby turn the turning lever 18 and move the pin 18a to a non-operating position. It is a matter of course that the engaging length of the pin 18a with the tape cassette 31 is set shorter than the height of the window portion 36 of the compact cassette 31.

As described above, the tape cassette of the present embodiment has interchangeable with the conventional compact cassette 31 in terms of dimensions and shape. Therefore, even when the conventional compact cassette is loaded on the magnetic recording/reproducing apparatus for loading the tape cassette of the present invention, it can be loaded without being obstructed by the shutter opening and closing mechanism.

Figure 12:
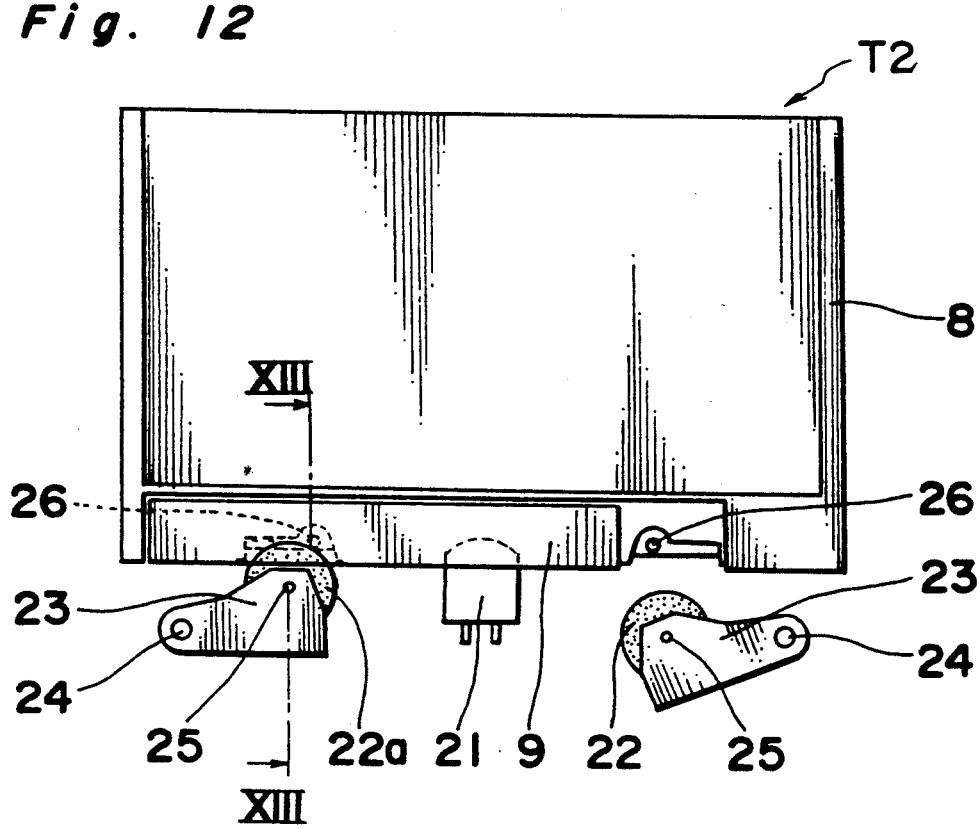
FIG. 12 is a top plan view showing a tape cassette according to a second embodiment of the invention, in a state in which the magnetic head and pinch roller are inserted into the insertion windows of the tape cassette.
Figure 13:
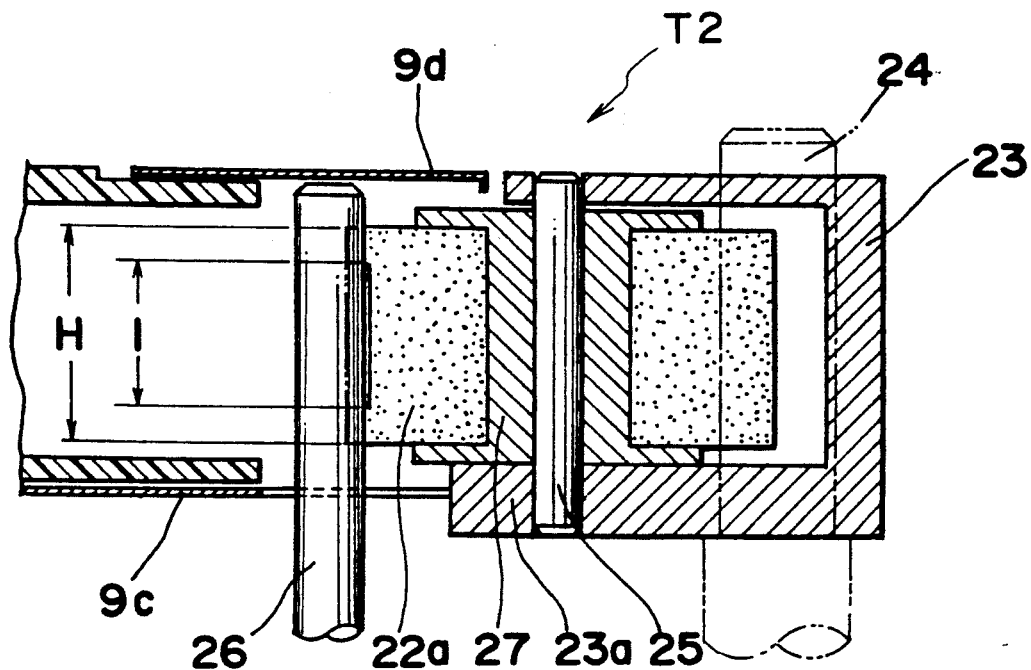
FIG. 13 is a fragmentary cross section, on an enlarged scale, taken along the line XIII—XIII in FIG. 12.

Referring to FIGS. 12 and 13, a tape cassette T2 according to a second embodiment of the present invention will be explained, with reference also to FIGS. 1 to 4 at portions to indicate a similar construction, with like parts being designated by like reference numerals.

Figure 3:
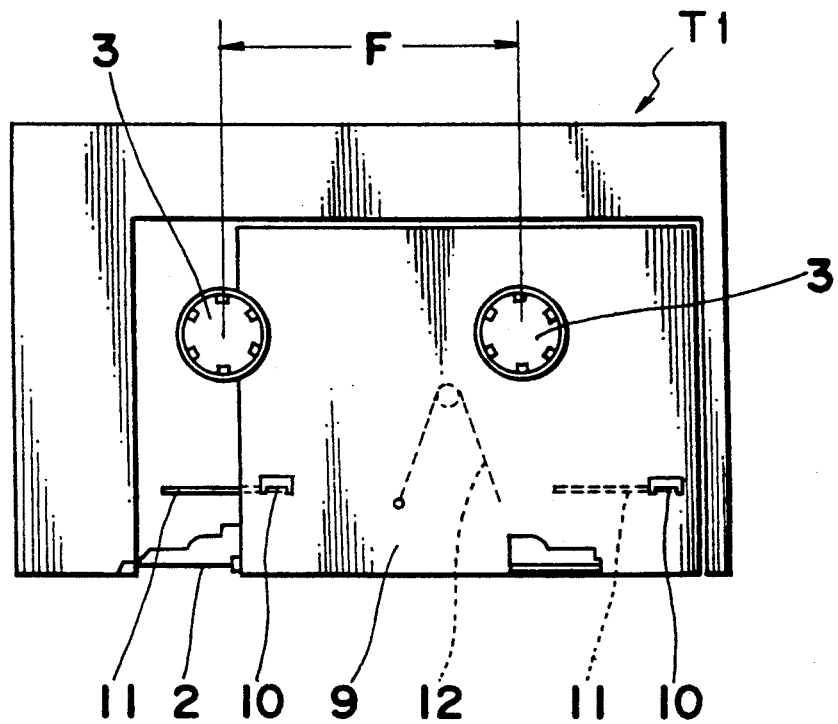
FIG. 3 is a bottom view of the tape cassette shown in FIG. 1.
Figure 4:
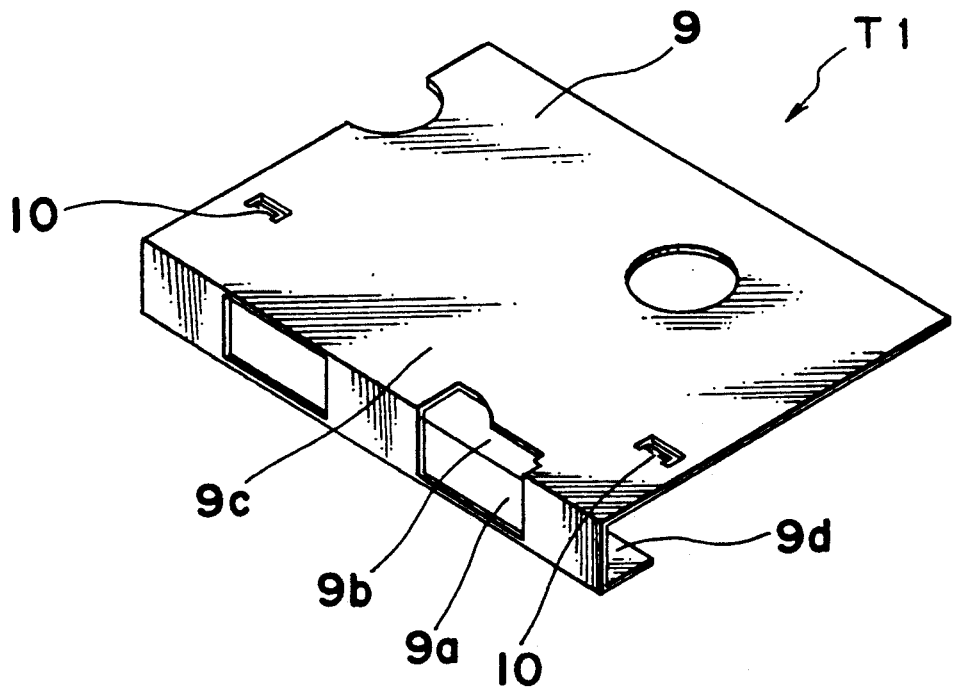
FIG. 4 is a bottom perspective view of the shutter member of FIG. 1.

Similar to the construction in FIGS. 1, 3 and 4, the tape cassette T2 of the second embodiment also includes the cassette shell housing 8 within which is stored the magnetic tape 2 and which has the pair of reel insertion holes 3 where the reel shafts are inserted to wind the magnetic tape 2 at one side of the cassette shells housing 8. The distance F between the pair of reel insertion holes 3 is set to be the same as the distance C between the pair of reel insertion holes 33 of the conventional compact cassette 31 in FIG. 5 as referred to earlier. The cassette shell housing 8 has the insertion window 4 for the magnetic head and the insertion windows 5 for the pinch rollers at the front side. These insertion windows 4 and 5 are virtually and generally at the same position and of the same dimensions as those in the conventional compact cassette 31.

The shutter member 9 with the U-shaped cross section selectively opens and closes the insertion windows 4 and 5 through sliding movement, as it is slidably guided along the guide groove means 11 formed in the cassette shell housing 8 in the longitudinal direction and is normally urged in the closing direction by the urging means 12. The shutter member 9 has a pinch roller insertion opening 9a at the position corresponding to the insertion window 5 for the pinch roller 22, and a rearwardly extending recess 9b which is adjacent to the pinch roller insertion opening 9a for the pinch roller 22 on one face 9c of the two faces 9c and 9d (FIG. 4).

The operation of the tape cassette as described above will be explained hereinafter.

In the tape cassette T2 according to the second embodiment, at the open position, when the shutter member 9 slides along guide grooves 11 and completely opens the insertion windows 4 and 5, the magnetic head 21 is inserted into the insertion window 4, and one pinch roller 22a of the pinch rollers 22, each rotatably mounted by a shaft 25 at the forward end of a lever 23 which is pivotally supported for pivotal movement about a pin 24, is inserted in the insertion window 5 as shown in FIG. 12. At this moment, the magnetic tape 2 is held between the pinch roller 22a and a capstan 26 and fed to the left.

As illustrated in FIG. 13 showing a cross section taken along the line XIII—XIII in FIG. 12 on an enlarged scale, the pinch roller 22a made of rubber is rotatably mounted by a bearing 27 for rotation about the shaft 25. A width H of the pinch roller 22 should be about 1.5 times a width I of the magnetic tape 2.

Meanwhile, since the upper portion of the pinch roller 22a inserted into the cassette shell housing 8 is covered by the face 9d of the shutter member 9 extending in the magnetic head inserting direction, there is no room for a shaft supporting portion at the upper side of the lever 23 of the pinch roller 22. However, due to the provision of a recess or notch 9b corresponding to the pinch roller 22 at the lower portion of the shutter member 9, the shaft 25 may be forced into and held by a shaft supporting portion 23a of the lever 23 corresponding thereto (FIG. 13).

As described above, according to the tape cassette of the second embodiment, the slidable shutter member for selectively opening or closing the insertion windows of the cassette shell housing is arranged to cover the upper portion of the pinch roller inserted into the cassette shell housing at the open position, while the shutter member is formed with a recess at its lower portion so as to correspond to the pinch roller, and therefore, a pinch roller capable of maintaining a sufficient tape driving force may be freely designed, thus making it possible to prevent entry of dust and the like from above, not only at the closed position, but also at the open position of the shutter member when the tape cassette is loaded on a magnetic recording/reproducing apparatus.

Figure 14:
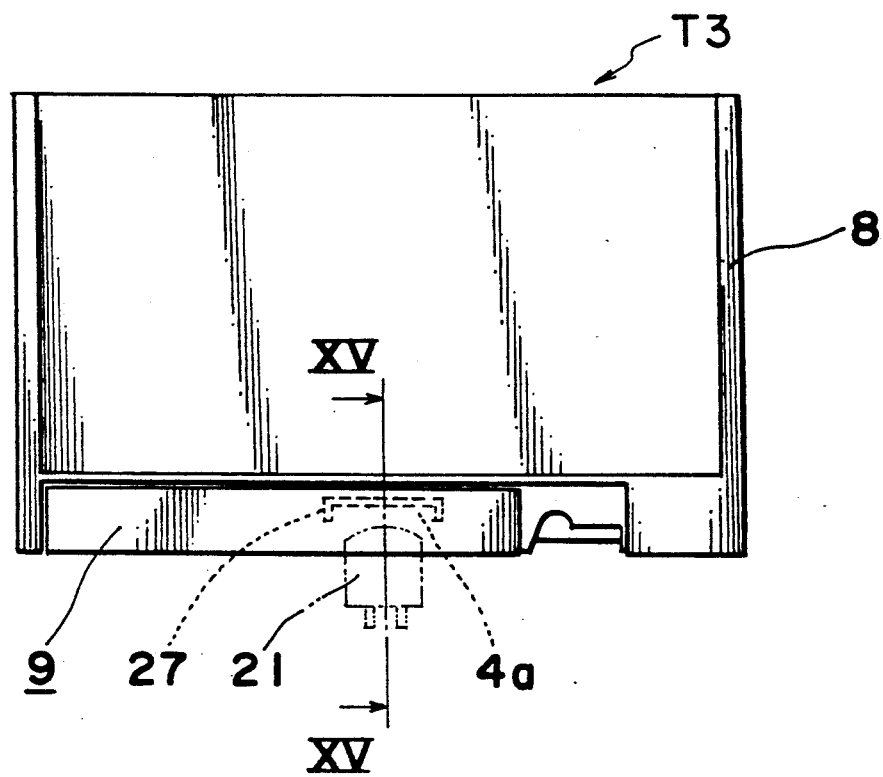
FIG. 14 is a view similar to FIG. 12, but which relates particularly to a third embodiment of the present invention.
Figure 15:
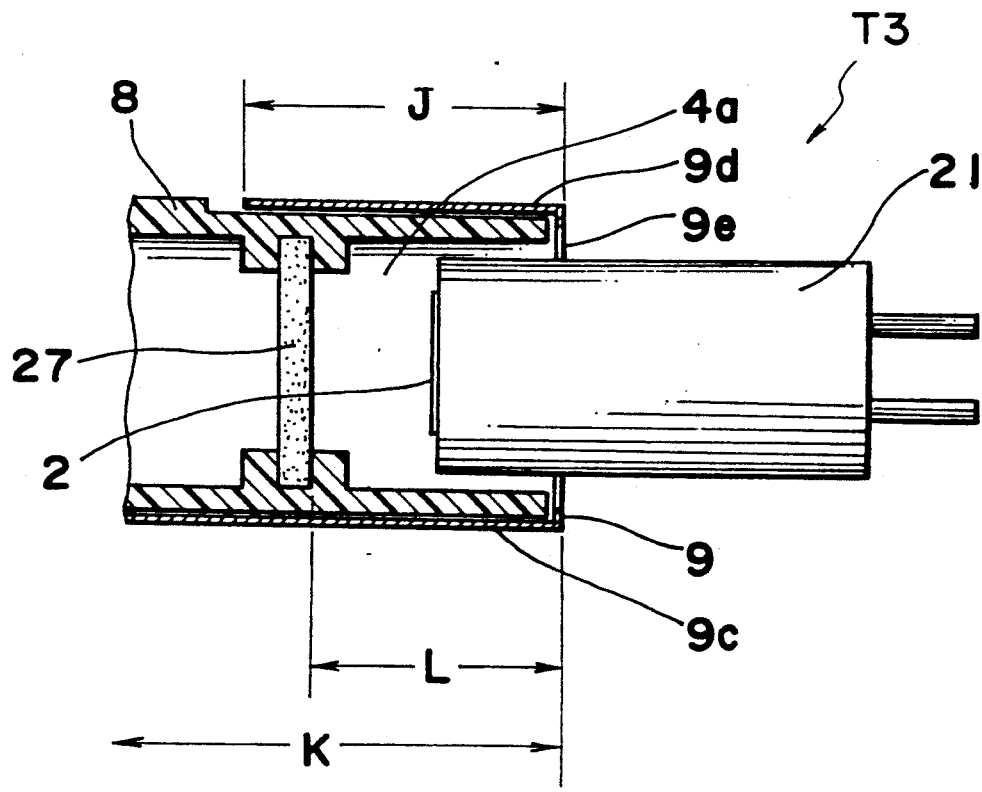
FIG. 15 is a fragmentary cross section, on an enlarged scale, taken along the line XV—XV in FIG. 14.
Figure 16:
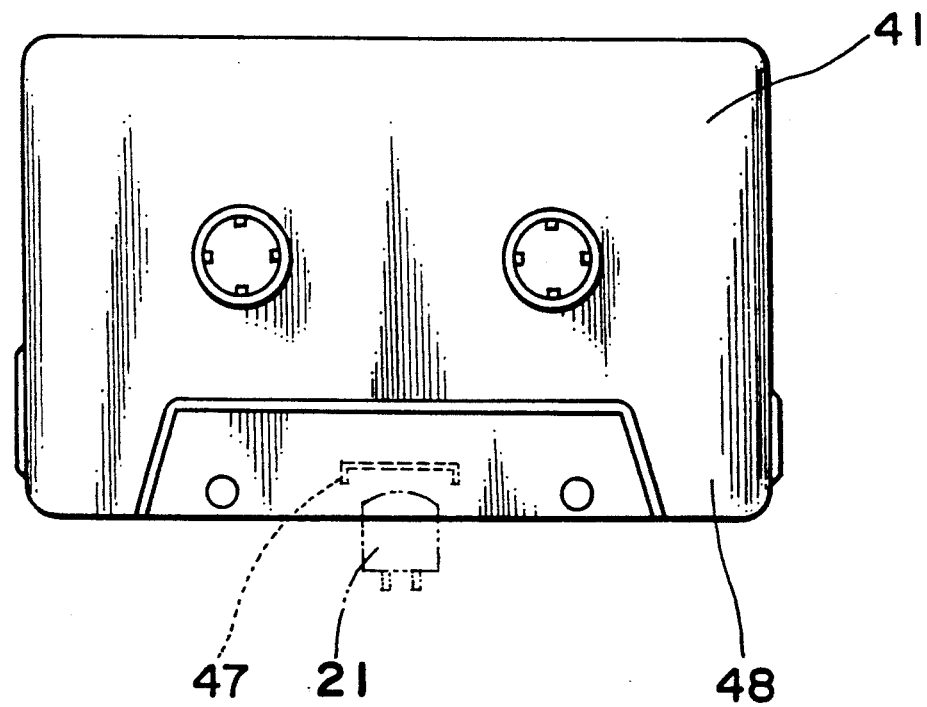
FIG. 16 is a top plan view showing another example of a conventional compact cassette.

Referring further to FIGS. 14 and 15, a tape cassette T3 according to a third embodiment of the present invention will be explained, with reference also to FIGS. 1 to 4 at portions to indicate similar construction, with like parts being designated by like reference numerals.

In FIGS. 1, 3, 4 and 14, the cassette shell structure 8 accommodating the magnetic tape 2 therein has a shield board 27 made of steel, stainless steel or the like, and disposed at an inner side 4a of the insertion window 4 for the magnetic head. The shutter member 9 having a U-shaped cross section and also made of a shield material such as steel or stainless steel is similarly arranged to selectively open or close the insertion windows 4 and 5, as the guides 10 of the shutter member 9 slide along the guide grooves 11 of the cassette shell housing 8.

As shown in FIG. 15, lengths J and K of two faces 9d and 9c from a front face 9e of the shutter member 9 extending in the direction of insertion of the magnetic head are each set to be longer than a length L from the front face 9e up to the shield board 27 provided at the inner side 4a of the magnetic head insertion window 4 of the cassette shell structure 8.

In the tape cassette T3 of the third embodiment, the shutter member 9 is thus slid along the guide grooves 11, and allows the magnetic head 21 to be inserted into the insertion window 4 of the cassette shell structure 8 at the open position.

In the above state, the front, upper, and lower faces, and also the right and left faces of the magnetic head 21 inserted into the cassette shell structure 8 are covered by the shield materials of the shield board 27, by two faces 9c and 9d extending in the magnetic head inserting direction of the shutter member 9, and by the magnetic head confronting face 9e (FIG. 15).

As is clear from the foregoing description, the tape cassette according to the present invention is suitable for digital recording and playback which require high reliability, is interchangeable in terms of dimensions and shape with the conventional compact cassettes, is provided with the shutter member which selectively opens and closes the insertion windows for the magnetic head and pinch rollers and is normally urged in the closing direction, to thereby prevent dust, etc. from entering.

Moreover, since the shutter member is arranged to slide in the direction of tape travel, there is no increase in the volume of the tape cassette even during opening or closing of the shutter member. This also contributes to size reduction of the compact cassette.

Furthermore, in the tape cassettes according to the present invention, since the front side of the magnetic head is covered with the shield board made of steel or stainless steel, and the upper, the lower, the right and the side faces of the magnetic head are surrounded by the shutter of steel or stainless steel which has a shield effect, the electro-magnetic waves from the mechanism and external appliances for the magnetic head can be prevented. Therefore, good recording and playback can be achieved.

Although the present invention has been fully described by way of example with reference to the accompanying drawings, it is to be noted here that various changes and modifications will be apparent to those skilled in the art. Therefore, unless such changes and modifications otherwise depart from the scope of the present invention, they should be construed as included therein.

What is claimed is:

1. A tape cassette comprising:
   a shell housing having a longitudinally extending front face, upper and lower surfaces, and a longitudinally extending guide groove formed in one of said upper and lower surfaces, said shell housing including a tape storage portion for storing a magnetic tape therein and having a pair of reel insertion holes formed therein, and a window portion which is of substantially the same thickness as said tape storage portion, a magnetic head insertion window and a pinch roller insertion window being formed in said front face of said shell housing at said window portion thereof;
   a shutter member having a U-shaped cross section, a longitudinally extending front portion, a longitudinally extending top portion, and a longitudinally extending bottom portion, and including a guide member mounted one of said top and bottom portions and slidably mounted in said guide groove, such that said shutter member is slidable along said front face of said shell housing between an opening position and a closing position;

shutter urging means for urging said shutter member toward said closing position;

wherein said shell housing includes a coupling portion, for engaging with a shutter opening/closing member of a magnetic recording/reproducing apparatus, at said front face thereof and at a longitudinal positional along said front face which is adjacent a longitudinal end of said shutter member when said shutter member is in said closing position;

wherein an edge of said coupling portion is disposed at least 34 mm in a longitudinal direction from a longitudinal central position between said pair of reel insertion holes;

wherein said shutter member has a pinch roller insertion opening formed in said front portion thereof at a longitudinal position therealong at which said pinch roller insertion opening of said shutter member registers with said pinch roller insertion window of said shell housing when said shutter member is in said opening position; and wherein said shutter member a recess formed in one of said top and bottom portions thereof and extending rearwardly from said pinch roller insertion opening, the other of said top and bottom portions of said shutter member being solid at a location thereof adjacent said pinch roller insertion opening.

2. A tape cassette as recited in claim 1, wherein one of said top and bottom portions of said shutter member extends rearwardly to a position rearward of said reel insertion holes of said shell housing.

3. A tape cassette as recited in claim 1, wherein said shutter member further has a magnetic head insertion opening formed in said front portion thereof at a longitudinal position therealong at which said magnetic head insertion opening of said shutter member registers with said magnetic head insertion window of said shell housing when said shutter member is in said opening position.

4. A tape cassette as recited in claim 3, wherein said shell housing further has an additional pinch roller insertion window formed in said front face thereof on a longitudinal side of said magnetic head insertion window opposite said pinch roller insertion window; and said shutter member, when in said opening position, is positioned to one side of said additional pinch roller insertion window.

5. A tape cassette as recited in claim 3, wherein at least a portion of said front portion of said shutter member which has said pinch roller insertion opening and said magnetic head insertion opening formed therein is formed as an integral piece, such that said pinch roller insertion opening and said magnetic head insertion opening are moved together in a single longitudinal direction when said shutter member is moved between said opening position and said closing position.

6. A tape cassette comprising:

a shell housing having a longitudinally extending front face, upper and lower surfaces, and a longitudinally extending guide groove formed in one of said upper and lower surfaces, said shell housing including a tape storage portion for storing a magnetic tape therein and having a pair of reel insertion holes formed therein, and a window portion which is of substantially the same thickness as said tape storage portion, a magnetic head insertion window and a pinch roller insertion window being formed in said front face of said shell housing at said window portion thereof;

a shutter member having a U-shaped cross section, a longitudinally extending front portion with a magnetic head insertion opening formed therethrough, a longitudinally extending top portion, and a longitudinally extending bottom portion, and including a guide member mounted to one of said top and bottom portions and slidably mounted in said guide groove, such that said shutter member is slidable along said front face of said shell housing between an opening position and a closing position;

shutter urging means for urging said shutter member toward said closing position;

an electromagnetic shield board mounted at a predetermined position in said shell housing directly rearwardly of said magnetic head insertion window; and wherein said shutter member is formed of an electromagnetically shielding material, and said upper and lower portions of said shutter member extend rearwardly beyond said predetermined position at which said shield board is mounted, such that when a magnetic head is inserted through said magnetic head insertion opening and said magnetic head insertion window, the magnetic head will be shielded at its rear, top, bottom, and sides.

7. A tape cassette as recited in claim 6, wherein said electromagnetic shield board extends vertically between said upper and lower surfaces of said shell housing.

8. A tape cassette as recited in claim 6, wherein said front portion of said shutter member has a pinch roller insertion opening formed therethrough, and at least a portion of said front portion of said shutter member which has said pinch roller insertion opening and said magnetic head insertion opening formed therein is formed as an integral piece, such that said pinch roller insertion opening and said magnetic head insertion opening are moved together in a single longitudinal direction when said shutter member is moved between said opening position and said closing position.

* * * * *